Patented May 23, 1933

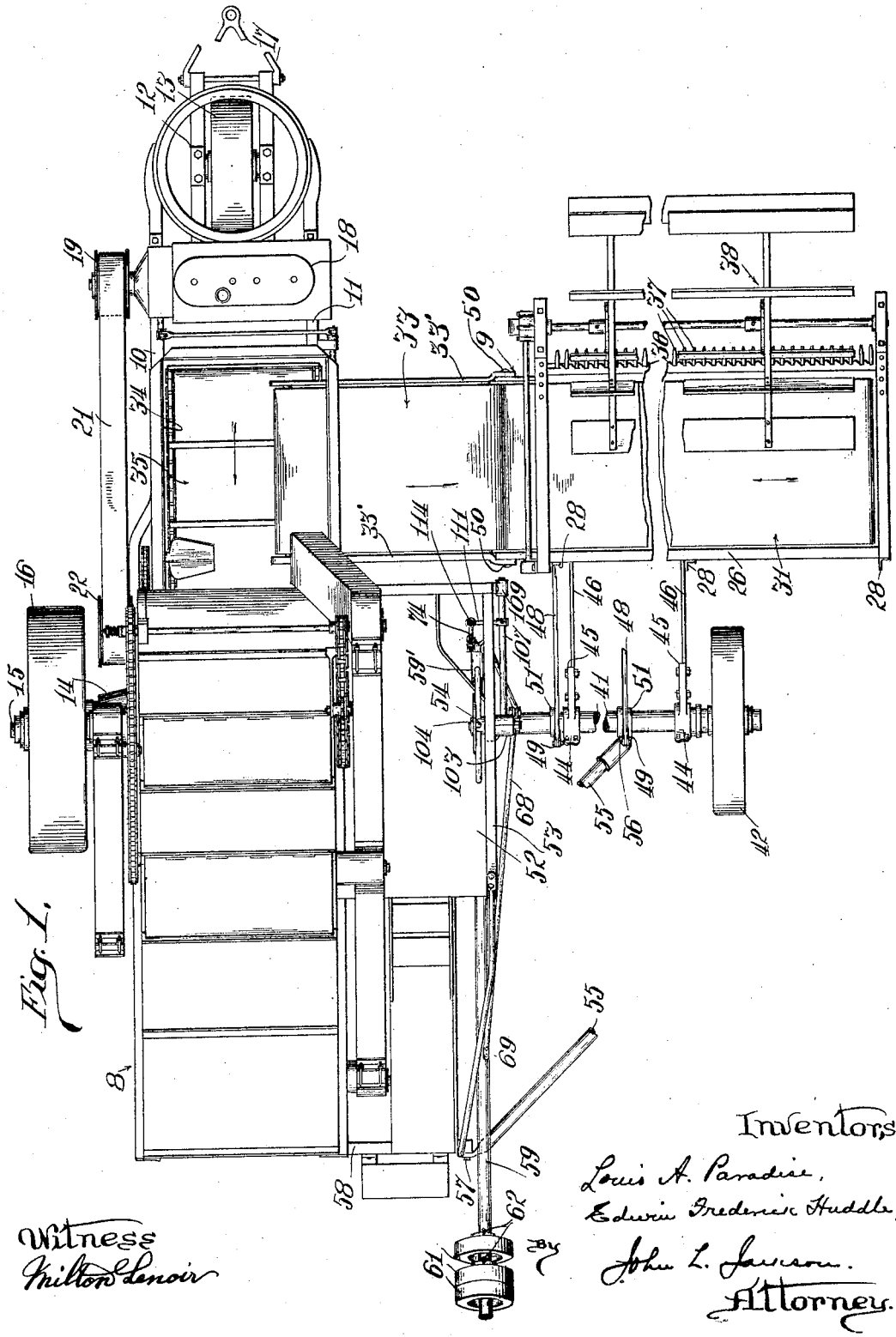

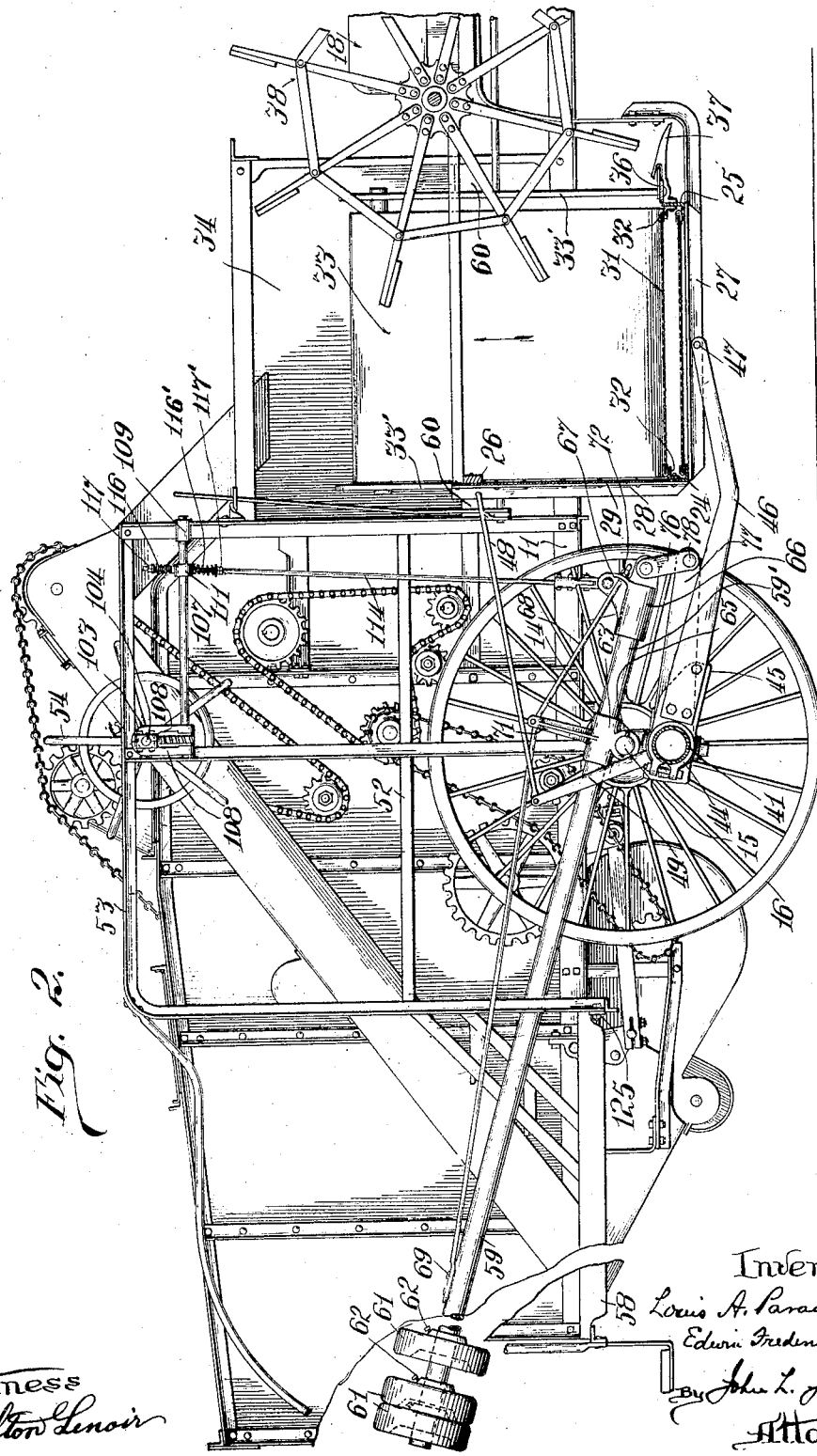

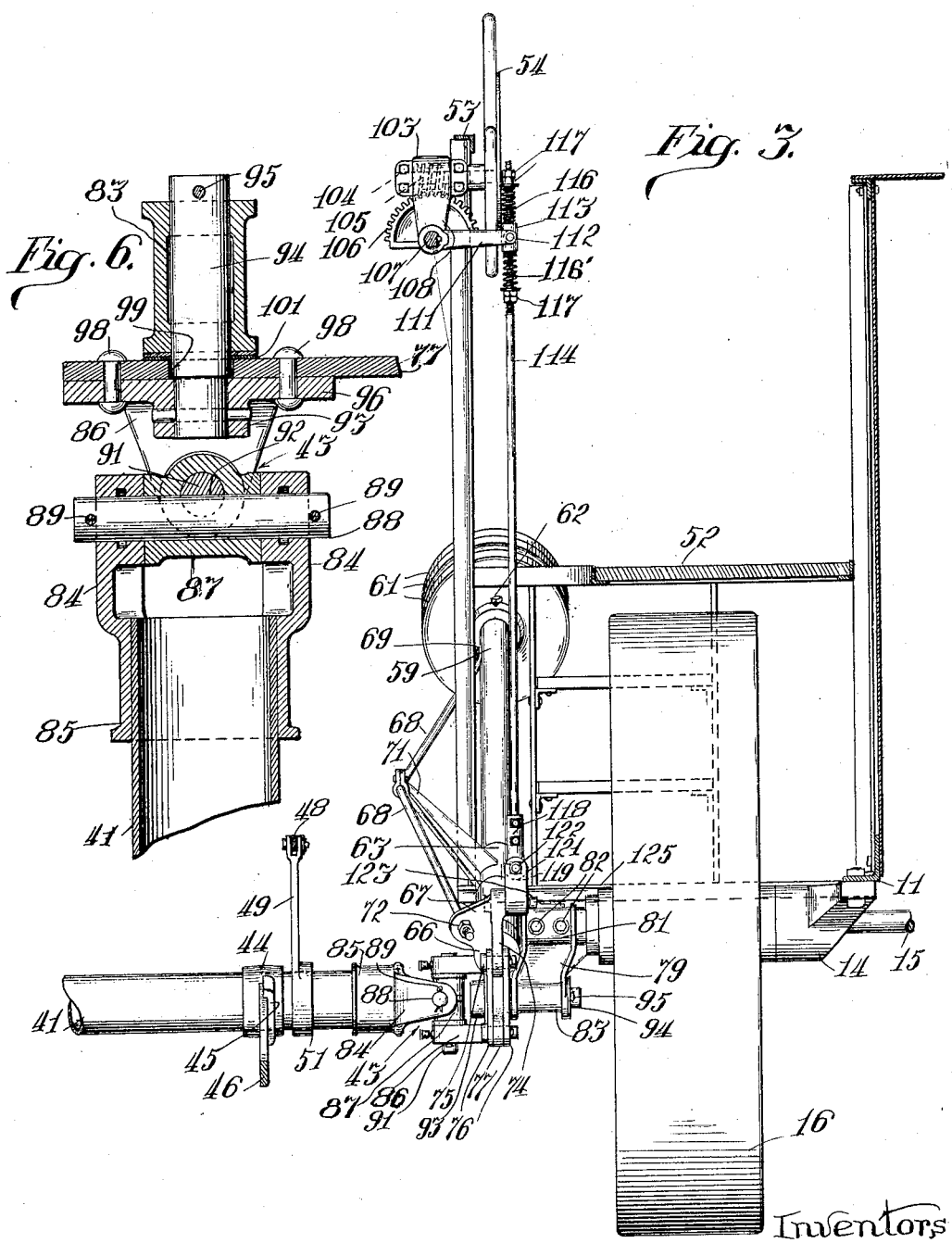

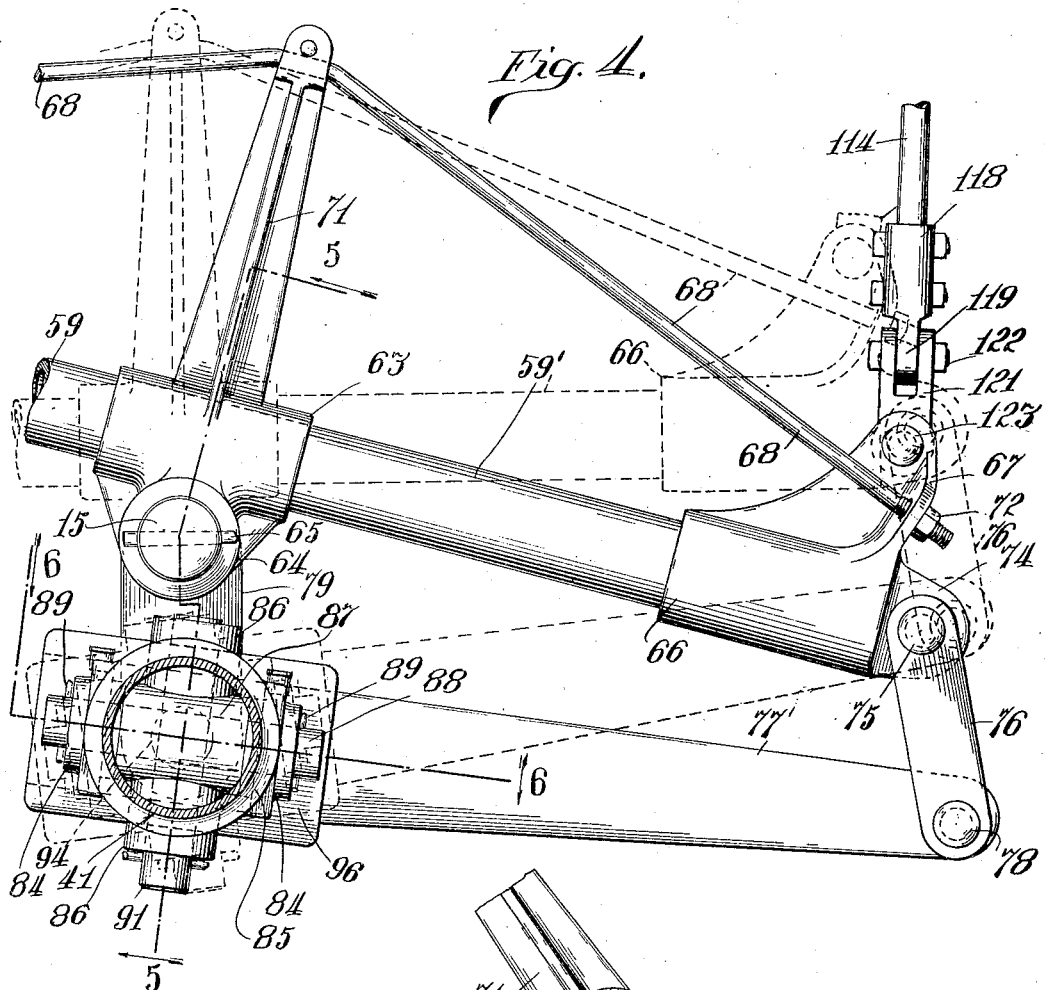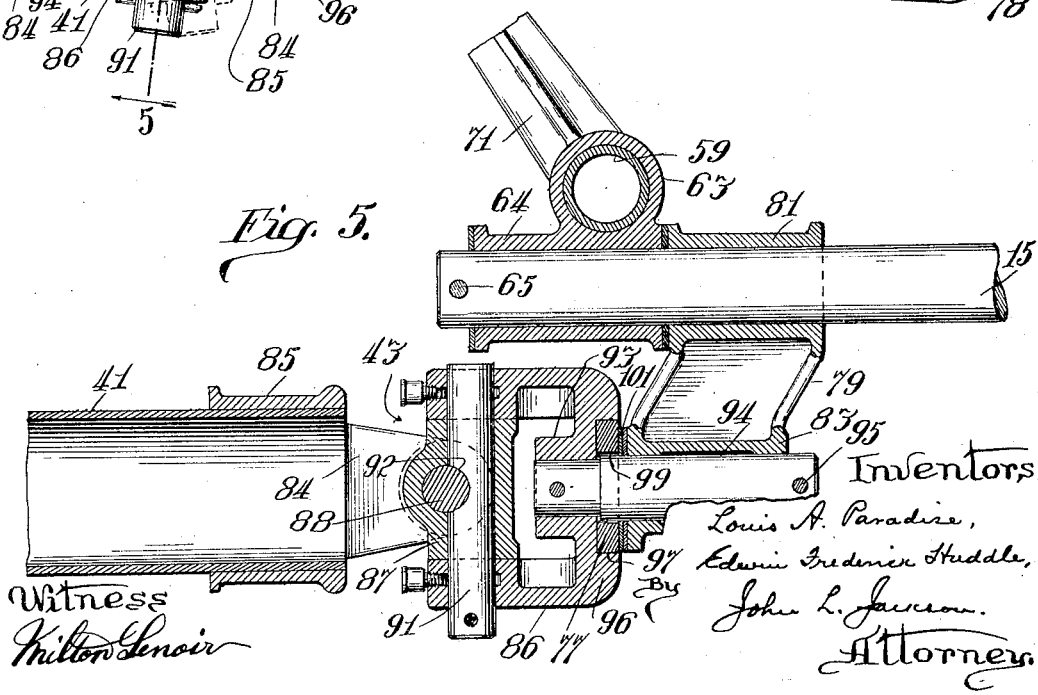

1,910,632

UNITED STATES PATENT OFFICE

LOUIS A. PARADISE AND EDWIN FREDERICK HUDDLE, OF MOLINE, ILLINOIS, ASSIGNORS TO DEERE & COMPANY, OF MOLINE, ILLINOIS, A CORPORATION OF ILLINOIS

COMBINED HARVESTER AND THRESHER

Application filed May 28, 1927. Serial No. 194,884.

The present invention relates to machines designed for cutting standing grain and threshing it as a continuous operation, and it has for its general object to provide improvements in the manner of supporting, counterbalancing and adjusting the harvester unit of the machine.

More specifically, it is one of the objects of the invention to provide improved supporting means for the harvester unit, which will be cheaper to construct, lighter in weight, and more compact to transport, than the prior supporting structures usually provided for these harvester units. Preferably this supporting means is in the form of an outrigger beam or axle projecting laterally from the main frame of the machine and having arms extending therefrom at spaced points on which the harvester unit is supported. The outer end of this axle is supported by a ground wheel, and the arrangement is such that by the axial rotation of such axle the harvester unit can be raised or lowered for adjusting the height at which the grain is cut.

A further object of the invention is to provide improved connecting means between the inner end of such outrigger axle and the main frame, such connecting means preferably being in the form of a universal joint permitting axial rotation of the axle in the above described adjustment of the harvester unit, and also permitting vertical angulation between the harvester unit and the main frame in the travel of the machine over uneven ground.

A further object of the invention is to provide improved counterbalancing means for the harvester unit, preferably in the form of a counterweighted arm which is connected to establish a counterbalancing torque in the outrigger axle. Other features pertaining to this counterbalancing characteristic of the invention are the arrangement whereby the weight of the counterbalancing arm is supported on the threshing unit, and whereby the counterbalancing torque thereof is transmitted to the outrigger axle through the universal joint above mentioned.

A further object of the invention is to provide improved means for adjusting the cutting height of the harvester unit, such adjustment being effected from a controlling device located at an operator's station on the machine. This adjustment of the harvester unit can be effected while the machine is in operation in the field.

A further object of the invention is to mount and connect the several parts described above in such manner that the harvester unit and the outrigger supporting means can be readily disconnected from the machine for reducing the transverse dimensions thereof, when it is desired to transport the machine from one scene of operations to another.

Other objects will appear in the following detailed description of a preferred embodiment of the invention. Referring to the accompanying drawings illustrating this embodiment:

Figure 1 is a plan view of the entire machine, the intermediate portion of the harvester unit being broken away to illustrate the machine on as large a scale as possible.

Fig. 2 is a fragmentary side view of the machine, illustrating the harvester unit in section.

Fig. 3 is a fragmentary elevation showing the universal joint connection between the outrigger axle, the counterbalancing arm and the main frame, as viewed from the front end of the machine.

Fig. 4 is a side view of this same universal joint connection.

Fig. 5 is a vertical sectional view through the universal joint, taken on the plane of the line 5—5 of Fig. 4, and Fig. 6 is a horizontal sectional view taken on the plane of the line 6—6 of Fig. 4.

Combined harvesters and threshers are typically constructed with a main frame, on which is supported the threshing mechanism, and an outwardly projecting harvester frame, on which is supported the harvester mechanism for cutting the grain. Referring to Figure 1, the threshing unit is indicated in its entirety at 8 and the harvester unit at 9. The main frame of the machine is represented by the two spaced frame bars 10 and 11 which are supported at their forward ends by a swiveled steering truck 12, in which is journaled a steering wheel 13. The rear portions of these main frame bars have suitable bearings or brackets 14 secured thereto (Fig. 3) which receive an axle 15 on which rear wheels 16 are journalled. These machines are generally pulled by a tractor hitched to the front end of the main frame, a conventional draft bar for this purpose being indicated at 17.

The threshing mechanism, which is supported on the rear portion of the main frame, may be of any approved type, and separately considered, forms no part of the present invention. The detail construction of the threshing mechanism which we contemplate employing in the present machine has been set forth at length in our copending application, Serial No. 193,128 and in the application of Louis A. Paradise, Serial No. 193,129 both filed May 21, 1927. Power for driving the threshing mechanism and the operating parts of the harvester unit may be derived from a power take-off on the tractor which pulls the machine, or it may be derived from a separate power plant located preferably at the front end of the main frame. The internal combustion engine 18 is illustrative of the latter arrangement. From a pulley 19 on the engine crank shaft a belt 21 extends back to a pulley 22 operatively connected to the threshing mechanism. From this threshing mechanism a drive is transmitted to the harvester unit for driving the conveyor apron, the sickle bar and the reel of such unit, but inasmuch as the details of this power transmission form no part of the present invention we have not illustrated the same.

The frame of the harvesting unit 9 comprises two angle bars 24 and 25, forming the two lower corners of the frame, and an upper bar 26 which forms the upper rear edge of the frame. The frame is braced transversely by angle bars 27 which extend cross-wise of the frame and have their ends joined to the corner bars 24 and 25. Upwardly extending angle bars 28 join the upper frame bar 26 to the lower frame bar 24. A back wall 29 of sheet metal closes the rear side of the harvester frame.

The cut grain falls upon the usual apron or conveyor 31 which passes along the bottom of the harvester frame; in the construction shown, the upper stretch of this conveyor being supported on angle brackets 32, and the lower stretch of the conveyor being supported on the flanges of the frame bars 24 and 25. The cut grain is carried inwardly by the conveyor toward the threshing unit and at the inner end of such conveyor it is transferred to a short inclined conveyor 33 which carries the grain upwardly and dumps it into a feeding hopper 34 disposed in front of the threshing mechanism. From this point the grain is carried rearwardly to the threshing cylinder on a longitudinally extending conveyor 35 which travels in the bottom of the feeding hopper 34. If desired, the inclined conveyor may consist of two traveling aprons, one spaced above the other to form an inclined closed chute therebetween through which the grain is conveyed. Such apron or aprons travel between side members 33′ which form a frame for the conveyor.

The cutting of the grain is performed by any suitable sickle bar 36 and cooperating finger bar 37, mounted at the front edge of the harvester frame. The usual reel 38 is supported above the cutting mechanism for presenting the standing grain to the sickle bar and for delivering it to the conveyor 31. As before remarked, the driving of the conveyor 31, the reciprocation of the sickle bar 36 and the rotation of the reel 38 may be effected through any desired system of power transmission mechanism, the present invention not being concerned with this driving mechanism.

Extending outwardly from the main frame of the machine, and disposed in rear of the harvester frame, is a beam or axle 41, which for convenience of reference I shall refer to as the outrigger axle, inasmuch as it, together with the harvester unit, forms an outrigger part of the main frame. This axle is preferably a length of heavy pipe or tubing and is supported at its outer end by a ground wheel 42 journaled for free rotation thereon. The inner end of the axle has support in a universal joint generally designated 43, which is connected to the threshing unit or main frame. As will hereinafter appear, this universal joint permits axial rotation of the outrigger axle for raising and lowering the harvester unit, and also permits the outer wheeled end of the axle to rise and fall relative to the main frame in the rolling of the ground wheel 42 over irregular ground. Rigidly secured to the axle 41 at spaced points along its length are two or more clamps 44 which are formed with forwardly extending angular socket portions 45. Bolted in these socket portions are arms 46 which extend forwardly under the harvester frame to support the same. The latter preferably has a pivotal mounting on these arms, by the provision of pivot pins 47 passing through the ends of the arms and through the lower frame bars 27. The harvester frame is braced by a plurality of links 48, each of which has pivotal connection at its front end with one of the upright frame bars 28, and at its rear end with an arm 49 extending upwardly from the axle 41. As shown in Figs. 1 and 3, each of these arms 49 is provided with a collar portion 51 which engages over the axle and is rigidly secured thereto. By virtue of this mounting of the harvester unit on the arms 46 it will be evident that when the axle 41 is revolved the harvester unit will be raised or lowered correspondingly. The lower ends of the frame members 33' of the inclined conveyor 33 are pivotally connected to the inner end of the harvester frame, as indicated at 50 in Fig. 1, and the upper ends of such frame members have slidable support on the upper edge of a low wall 60 (Fig. 2) extending along the harvester side of the feeding hopper 34. Thus, in the vertical adjustment of the harvester unit, the inclined conveyor will have a hinged swinging movement, its inner end sliding in and out across the top of the wall 60. Such vertical adjustment of the harvester unit is placed under the control of an operator stationed on a platform 52 at the harvester side of the threshing unit. An open frame 53 extends along one side of this platform to form a railing therefor, and mounted on this frame is a hand wheel 54 which is operative to raise or lower the harvester unit through linkage which we shall presently describe.

The propelling or tractive force for causing the outrigger axle and harvester unit to move forwardly with the machine is applied to the inner end of the axle through the universal joint 43, and to the outer end of the axle through a diagonal strut 55. The front end of this strut has suitable pivotal connection at 56 with the outer collar 51 secured to the axle 41, and the rear end of the strut has pivotal connection at 57 with an extending frame member 58 of the threshing unit. The strut is thus free to swing upwardly and downwardly with the rise and fall of the ground wheel 42 in its travel over uneven surfaces. The weight of the harvester unit is counterbalanced through a long counterweighted lever 59 so as to facilitate the operation of raising and lowering the harvester. As shown in Figs. 4 and 5, this lever preferably consists of a length of heavy pipe or tubing on the rear end of which a plurality of counterweights 61 are adjustably secured by set screws 62. The lever is pivotally supported on an axis located slightly above the axis of the outrigger axle 41, although these axes might be coincident if desired. The lever passes through a sleeve 63 formed as an integral part of a rocking bearing 64. It is desirable to have the weight of the counterbalancing system carried on the main frame, and to this end the rocking bearing 64 is pivotally mounted on the main frame axle 15, the latter being extended beyond the adjacent rear wheel 16 to serve as this bearing support. The axle 15 is a dead axle i. e. it has no rotation with the wheels 16. The bearing boss 64 is detachably held thereon by a removable pin 65 passing through the end of the axle.

The lever 59 extends beyond the sleeve 63 to form a forwardly projecting lever arm 59' on the end of which is secured a bracket 66. A lug or web 67 extends upwardly from this bracket and is apertured to receive one end of a tension rod 68 which reinforces the counterbalancing lever. The opposite end of this rod is secured to the lever adjacent its rear end, as indicated at 69, and the intermediate portion of this rod extends through the forked upper end of a strut 71 projecting upwardly and outwardly from the sleeve 63. The end which passes through the lug 67 is threaded to receive a nut 72, and by tightening up on this nut a reinforcing tension may be placed on the rod for carrying part of the bending stresses set up in the counterbalancing lever. Extending from the end of the bracket 66 is a lug 74 which receives a pivot pin 75 passing through the upper ends of links 76 disposed on opposite sides of the lug 74. The lower ends of these links engage over opposite sides of a lever or arm 77, disposed below the counterbalancing lever, to which arm 77 the links are pivotally connected by a pivot pin 78. This lower arm transmits the counterbalancing torque of the lever 59 to the universal joint 43, which in turn transmits such counterbalancing torque to the outrigger axle 41. As best shown in Fig. 5, such universal joint is hung directly below the rear wheel axle 15 in a hanger bearing 79. The latter comprises an upper sleeve 81 which is rigidly secured to the axle, as by screws or bolts 82 (Fig. 3) which either pass through the axle or have set screw engagement therewith. The lower end of the hanger bearing is formed with a bearing boss 83 in which one of the yokes of the universal joint has pivotal mounting. The joint comprises an outer yoke 84 which is rigidly secured to the end of the outrigger axle 41 through a collar 85 of which the yoke forms a part. A second yoke 86 is disposed at right angles to the outer yoke 84 and has universal coupling therewith through a knuckle 87. A pivot pin 88 extends through the arms of the first yoke 84 and through this knuckle 87, such pin being held against displacement by cotter pins 89 which pass through the ends thereof on the outer sides of the yoke arms. A second pivot pin 91 extends downwardly through the arms of the second yoke 86 and passes through the knuckle 87. These two pivot pins intersect in the center of the knuckle, and the latter pivot pin 91 has a semi-circular recess 92 formed in one side thereof, through which the first pivot pin 86 passes. It will thus be seen that both pivot pins are positively held against accidental displacement, but when it is desired to uncouple the universal joint it is only necessary to remove one of the cotter pins 89 and to slide the pivot pin 88 out of the knuckle, whereupon both pivot pins are released.

The vertically extending bridge portion of the second yoke 86 has a boss 93 formed integral therewith, in which is pinned a heavy pivot stud 94. Such stud has rotatable bearing support in the bearing boss 83 of the hanger 79, thus affording a rotatable mounting for the universal joint 43 and axle 41. A pin 95 passing through the inner end of the stud 94 holds the latter in the bearing boss 83. The inner part of the second yoke 86 is also formed with a laterally extending plate portion 96, in which is formed a longitudinal recess 97. The counterbalancing arm 77 seats in this recess, being held therein by rivets 98 (Fig. 6) and having a hole 99 through which the pivot stud 94 passes. One or more thrust washers 101 may be interposed between the inner side of the arm and the end of the bearing boss 83. It will be observed from the foregoing construction that the counterbalancing torque of the lever 59 is transmitted through the links 76 and arm 77 to the outrigger axle, and that this counterbalancing torque is effective thereon through the universal joint in whatever angles the axle may assume in passing over uneven ground. It should also be noted that the entire weight of the counterbalancing mechanism is carried on the wheels of the main frame, so that none of this weight is borne by the universal joint and outrigger axle.

Referring now to the manual control mechanism through which the harvester unit is raised and lowered, it will be seen from Figs. 2 and 3 that the control wheel 54 has bearing support in a gear housing 103 which is suitably secured to the railing frame 53. The shaft 104 on which this control wheel is mounted, extends into such housing and is connected to a worm 105 therein. This worm meshes with a sector gear 106 which is secured to a horizontally extending shaft 107. The rear end of this shaft has bearing support in hanger bearings 108 extending down from the gear housing on each side of the sector gear, and has support at its front end in a bearing bracket 109 secured to the front portion of the railing frame 53. An arm 111 is keyed to such shaft adjacent the latter bearing bracket and has a forked end pivotally connected at 112 to a collar 113 mounted on a vertically extending operating rod 114. The collar 113 has a yieldable or cushioned connection with the rod 114 so as to absorb shock transmitted upwardly or downwardly through the rod from the harvester unit. To this end, the collar is arranged for sliding movement along the rod 114 between two compression springs 116 and 116' which bear at their inner ends against opposite ends of said collar and which bear at their outer ends against adjustable stop nuts 117—117' screwing down over the threaded upper end of the rod. The pressures of these springs may be adjusted by screwing the nuts 117—117' upwardly or downwardly along the threaded portion of such rod. Bolted to the lower end of such rod is a fitting 118 having a tongue 119 pivotally connected between the arms of a clevis 121 on a pivot bolt 122. This clevis is pivotally connected at 123 to the upwardly projecting lug 67, formed on the bracket 66 of the counterbalancing lever. It will be evident that rotation of the hand wheel 54 will operate through the worm and sector gearing to swing the arm 111 and rod 114 either upwardly or downwardly, and will thereby rock the outrigger axle 41 to raise or lower the harvester unit. Owing to the pitch of the worm and sector gearing 105—106, the harvester unit will be locked at any position to which it has been adjusted by the hand wheel 54. Obviously, by virtue of the counterbalancing of the harvester unit the latter can be raised or lowered with little effort applied to the adjusting wheel 54. The described construction of outrigger axle forms a very simple and compact supporting member for the harvester unit and through which this unit can be easily raised and lowered.

When it is desired to reduce the transverse dimensions of the machine for moving to a different scene of operations, the harvester unit and outrigger axle are disconnected from the thresher unit and are hitched to the rear of the main frame on a suitable trailer vehicle, or are loaded into a wagon. This disconnecting of the outrigger axle and harvesting unit only requires the uncoupling of the universal joint 43 and the dismounting of the strut 55 (the power transmitting connection to the harvester unit being also readily disconnectable). After the uncoupling of the universal joint 43 the counterbalancing lever 59 is lowered to rest on a bar 125 which projects laterally from the main frame. The harvester frame and the outrigger axle can be separated into two smaller units by merely removing the pivot pins 47 and disconnecting the links 48. The feature of having the counterweighted lever pivotally supported directly on the main frame of the thresher is obviously of great advantage when the harvester unit is disconnected for the purpose of transporting the machine to and from the field, as such mounting eliminates the necessity of dismounting the counterweighted lever and also avoids all problems incident to the handling of the lever.

What we claim as our invention and desire to secure by Letters Patent, is—

1. In a machine of the character described, the combination with a thresher unit comprising a wheeled main frame, of a wheeled supporting member extending laterally from said main frame, means pivotally connecting said supporting member to said main frame for rocking movement about a transverse axis, a harvester unit supported on said wheeled supporting member and comprising means for cutting the grain and feeding the same to said thresher unit, and means pivotally supported on said main frame for movement about an axis eccentrically disposed with respect to said first named axis for counterbalancing said harvester unit.

2. In a machine of the character described, the combination with a thresher unit comprising a main frame, an axle and a supporting wheel journaled thereon, of a wheeled supporting member extending laterally from said main frame, means pivotally connecting said supporting member to said main frame for rocking movement about an axis below the axis of said supporting wheel, a harvester unit supported on said wheeled supporting member and comprising means for cutting the grain and feeding the same to said thresher unit, an arm pivotally supported on said axle and operatively connected with said wheeled supporting member, and means biasing said arm for movement in a direction to counterbalance said harvester unit.

3. In a machine of the character described, the combination with a thresher unit comprising a wheeled main frame, of a wheeled supporting member extending laterally from said main frame, means pivotally connecting said supporting member to said main frame, a harvester unit supported in its entirety on said wheeled supporting member, and means including an arm pivotally mounted on the thresher unit and extending forwardly from its pivotal mounting, and means establishing an operative connection between the forward end of said arm and the wheeled supporting member for adjusting the cutting height of said harvester unit relative to the horizontal plane of said supporting member.

4. In a machine of the character described, the combination with a thresher unit comprising a wheeled main frame, of a wheeled supporting member pivotally connected to said main frame and extending laterally therefrom, a harvester unit supported on said wheeled supporting member, and means including an arm pivotally mounted on the thresher unit and extending forwardly from its pivotal connection, a forwardly extending arm connected with the harvester unit, means connecting the forward ends of said arms, and means adapted to swing the first named arm to raise the harvester unit.

5. In a machine of the character described, the combination with a thresher unit comprising a wheeled main frame, of a wheeled supporting axle extending laterally from said main frame, a harvester unit carried by said supporting axle, a universal joint pivotally connecting said supporting axle to said main frame for axial and angular movement about an axis spaced from the axis of said axle, and a counterweighted arm pivotally supported on the main frame and extending forwardly therefrom, a second arm extending forwardly and substantially parallel with said first arm and connected with said supporting axle, means connecting said arms to cause them to swing together, and biased means acting on the first arm for counterbalancing said harvester unit.

6. In a machine of the character described, the combination with a thresher unit comprising a wheeled main frame, of an outrigger axle extending laterally from said main frame, means pivotally connecting the inner end of said axle to said main frame for movement about a transverse axis, a ground wheel journaled on the outer portion of said axle, a harvester unit supported on said ground wheel, an arm pivotally supported on said main frame at a point spaced from said axis and having operative connection with said outrigger axle, and means connected with the arm for counterbalancing said harvester unit.

7. In a machine of the character described, the combination with a thresher unit comprising a main frame having a rear axle rigidly secured thereto and wheels mounted on said axle, of an outrigger axle extending laterally from said main frame, a hanger bearing on said rear axle, a universal joint having rotatable mounting in said hanger bearing and connected to the inner end of said outrigger axle whereby the axle supporting the harvester is supported eccentrically with respect to the axle supporting the thresher, a biased arm journaled on said rear axle, means operatively connecting said arm with said axle through said universal joint, a ground wheel journaled on the outer portion of said outrigger axle, arms extending from said latter axle, and a harvester unit supported on said arms and comprising means for cutting the grain and for feeding the same to said thresher unit.

8. In a machine of the character described, the combination with a thresher unit comprising a main frame having a rear axle and wheels mounted thereon, of an outrigger axle extending laterally from said main frame, and disposed eccentrically with respect to said rear axle, a universal joint connecting said outrigger axle with said main frame, a counterweighted lever journaled on said main frame, an arm extending from said universal joint, means connecting said counterweighted lever with said arm, a ground wheel journaled on the outer portion of said outrigger axle, arms extending from said latter axle, and a harvester unit supported on said arms and comprising means for cutting the grain and means for feeding the same to said thresher unit.

9. In a machine of the character described, the combination with a thresher unit comprising a wheeled main frame, of an outrigger axle extending laterally from said main frame, a universal joint connecting the inner end of said axle to said main frame, a ground wheel journaled on the outer portion of said axle, arms extending from said axle, a harvester unit pivotally supported on said arms, a torque arm extending from said universal joint, a counterbalancing means movably supported on said main frame and connected with said torque arm, an operator's platform on the harvester side of said main frame, an operating member supported at said platform, and actuating mechanism connecting said operating member with the torque arm of said universal joint for rotating the latter and said outrigger axle to raise and lower said harvester unit.

10. In a machine of the class described, the combination with a thresher unit comprising a wheeled main frame, of a wheeled supporting member extending laterally from said main frame, means pivotally connecting said supporting member to said main frame, harvester unit supported on said wheeled supporting member and comprising means for cutting the grain and feeding the same to said thresher unit, counter-balancing means movable relative to the thresher unit and operatively connected to counter-balance said harvester unit, a control member mounted on said main frame and adapted to be actuated to raise and lower said harvester unit relatively to said wheeled supporting member, and motion transmitting mechanism connecting said control member with said counterbalancing means.

11. A machine of the class described comprising, in combination, a thresher unit, a wheeled axle supporting the thresher, a harvester unit, a wheeled axle supporting the harvester, said axles being eccentrically disposed, and counterbalancing means for the harvester unit and comprising a member pivoted on one of said axles and connected with the other.

12. In a machine of the character described, the combination with a thresher unit comprising a wheeled main frame, of a wheeled supporting axle extending laterally from said main frame, a harvester unit carried by said supporting axle, a universal joint pivotally connecting said supporting axle to said main frame for axial and angular movement about an axis spaced from the axis of said axle, an arm pivotally supported on the main frame and extending forwardly therefrom, means connecting the forward end of said arm with the harvester unit to raise and lower the same, means associated with said arm and tending to rotate it in a direction opposite to the direction said supporting axle tends to rotate due to the weight of the harvester unit, and manually adjusted means connected with the forward end of said arm for adjusting the vertical position of the harvester unit.

LOUIS A. PARADISE.
EDWIN FREDERICK HUDDLE.